United States Patent
Nattermann et al.

(10) Patent No.: US 11,590,987 B2
(45) Date of Patent: Feb. 28, 2023

(54) METHOD AND CONTROL DEVICE FOR CONTROLLING A MOTOR VEHICLE

(71) Applicant: ZF FRIEDRICHSHAFEN AG, Friedrichshafen (DE)

(72) Inventors: Till Nattermann, Krefeld (DE); Christian Wissing, Wesel (DE); Manuel Schmidt, Dortmund (DE); Andreas Homann, Dortmund (DE); Christian Lienke, Gelsenkirchen (DE); Niklas Stannartz, Dortmund (DE); Torsten Bertram, Düsseldorf (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 17/087,684

(22) Filed: Nov. 3, 2020

(65) Prior Publication Data
US 2021/0129863 A1   May 6, 2021

(51) Int. Cl.
*B60W 30/18* (2012.01)
*B60W 60/00* (2020.01)
*G01C 21/34* (2006.01)

(52) U.S. Cl.
CPC .... *B60W 60/001* (2020.02); *B60W 30/18163* (2013.01); *G01C 21/3453* (2013.01); *B60W 2420/42* (2013.01); *B60W 2420/52* (2013.01); *B60W 2510/20* (2013.01); *B60W 2520/10* (2013.01)

(58) Field of Classification Search
CPC ......... B60W 60/001; B60W 30/18163; B60W 2420/42; B60W 2420/52; B60W 2510/20; B60W 2520/10; G01C 21/3453; G05D 1/0088
See application file for complete search history.

(56) References Cited

U.S. PATENT DOCUMENTS

| 10,229,600 B2 * | 3/2019 | So .................... B60W 30/08 |
| 2015/0142207 A1 | 5/2015 | Flehmig et al. |
| 2016/0082971 A1 * | 3/2016 | Fuehrer ................ B60W 50/14 |
| | | 701/48 |
| 2016/0225261 A1 * | 8/2016 | Matsumoto ......... B60W 10/184 |
| 2017/0043780 A1 * | 2/2017 | Yoon ............... B60W 30/18163 |

(Continued)

FOREIGN PATENT DOCUMENTS

| DE | 102015209974 | 1/2016 |
| WO | 2019206377 | 10/2019 |
| WO | 2020089311 | 5/2020 |

*Primary Examiner* — Angelina Shudy
(74) *Attorney, Agent, or Firm* — Tarolli, Sundheim, Covell & Tummino LLP (57) ABSTRACT

A method for controlling in an automated manner a motor vehicle (10) traveling on a road (12) in a current lane (14) is suggested, wherein the road (12) has at least one further lane (16). The method comprises the following steps: At least two preliminary driving maneuvers are generated and/or received, which include a lane change from the current lane (14) to the at least one further lane (16) and a starting time of the lane change. The starting times of the at least two preliminary driving maneuvers are at different times. The at least two driving maneuvers are compared taking into account the respective starting times. One of the starting times is selected based on the comparison. Further, a control device for a system for controlling a motor vehicle is also suggested.

8 Claims, 6 Drawing Sheets

(56) References Cited

U.S. PATENT DOCUMENTS

| | | | |
|---|---|---|---|
| 2017/0102705 A1* | 4/2017 | Silvlin | B60W 30/10 |
| 2017/0210379 A1* | 7/2017 | Obata | B60W 30/0956 |
| 2017/0242435 A1* | 8/2017 | Nilsson | G05D 1/0088 |
| 2017/0334453 A1 | 11/2017 | Mimura et al. | |
| 2018/0281785 A1* | 10/2018 | Berntorp | G08G 1/167 |
| 2018/0281854 A1* | 10/2018 | Talamonti | G01S 13/931 |
| 2019/0009784 A1* | 1/2019 | Takeda | B60W 30/18163 |
| 2019/0031202 A1* | 1/2019 | Takeda | B60T 8/171 |
| 2019/0054928 A1* | 2/2019 | Hatano | B60W 60/0057 |
| 2019/0061766 A1* | 2/2019 | Nishiguchi | B60W 30/18163 |
| 2019/0171206 A1* | 6/2019 | Abrams | G01C 21/3658 |
| 2019/0315357 A1* | 10/2019 | Zhang | G05D 1/0238 |
| 2019/0347939 A1* | 11/2019 | Kim | B60W 30/18163 |
| 2019/0354109 A1* | 11/2019 | Pierson | G08G 3/02 |
| 2019/0377352 A1* | 12/2019 | Weißwange | B60W 60/0011 |
| 2020/0050214 A1 | 2/2020 | Goehl et al. | |
| 2020/0070889 A1* | 3/2020 | Fukuda | B60W 30/143 |
| 2020/0142417 A1* | 5/2020 | Hudecek | B60W 30/0953 |
| 2020/0180633 A1* | 6/2020 | Wu | G08G 1/167 |
| 2020/0290619 A1* | 9/2020 | Mehdi | B60W 60/0011 |
| 2020/0290620 A1* | 9/2020 | Al Qizwini | G06F 16/29 |
| 2020/0363800 A1* | 11/2020 | Jojo-Verge | G05D 1/0212 |
| 2021/0061282 A1* | 3/2021 | Jafari Tafti | B60W 60/00276 |
| 2021/0108936 A1* | 4/2021 | Seegmiller | G01C 21/3461 |
| 2021/0114620 A1* | 4/2021 | Yu | B60W 30/045 |
| 2021/0163010 A1* | 6/2021 | Takabayashi | B60W 30/18163 |
| 2021/0173402 A1* | 6/2021 | Chang | B60W 40/09 |
| 2021/0269040 A1* | 9/2021 | Kurokawa | G08G 1/096791 |
| 2021/0300412 A1* | 9/2021 | Dingli | B60W 50/0098 |
| 2021/0362720 A1* | 11/2021 | Takahashi | B60W 10/20 |
| 2021/0402999 A1* | 12/2021 | Park | B60W 50/0098 |
| 2022/0009494 A1* | 1/2022 | Mahajan | G06N 20/00 |
| 2022/0126694 A1* | 4/2022 | Zhu | B60K 26/02 |
| 2022/0185289 A1* | 6/2022 | Arora | B60W 30/162 |
| 2022/0258769 A1* | 8/2022 | Mahajan | G06V 20/588 |
| 2022/0324482 A1* | 10/2022 | Guo | B60W 60/0011 |

* cited by examiner

METHOD AND CONTROL DEVICE FOR CONTROLLING A MOTOR VEHICLE

RELATED APPLICATION

This application claims priority from German Application No. 10 2019 129 879.2, filed Nov. 6, 2019, the subject matter of which is incorporated herein by reference in its entirety.

BACKGROUND OF THE INVENTION

The invention relates to a method for controlling a motor vehicle, a control device for a system for controlling a motor vehicle, a motor vehicle, as well as a computer program for carrying out the method.

One of the main challenges for driver assistance systems that control the longitudinal movement and transverse movement of a motor vehicle in a partially automated manner, and above all for fully automated motor vehicles, is to analyze a specific situation in which the motor vehicle is and, based on this, to derive appropriate driving maneuvers for the motor vehicle.

The complexity of the calculation of the driving maneuvers generally increases with the duration of the individual driving maneuvers. If different possible driving maneuvers are to be determined for a longer period of time, for example longer than three seconds, or if complex driving maneuvers with a plurality of lane changes are involved, previously known methods are often no longer able to determine them in real time.

In almost every traffic situation there are many different ways in which the motor vehicle can be controlled. The various options can differ greatly, for example in terms of the travel time required. Especially in heavy traffic, the previously known methods are often no longer able to select the appropriate option from the various options of controlling the motor vehicle.

A particular challenge here are lane changes, which the motor vehicle should carry out, for example, to overtake another road user. The starting time of the lane changes plays an important role, since all further driving maneuver planning depends on the starting time. Methods known up to now are not always able to select the optimal starting time for lane changes.

SUMMARY OF THE INVENTION

The object of the invention is therefore to provide a method and a control device for a system for controlling a motor vehicle which reliably allows to determine an optimal time for a lane change.

The object is achieved according to the invention by a method for in an automated manner controlling a motor vehicle traveling on a road in a current lane, the road having at least one further lane. The method comprises the following steps: At least two preliminary driving maneuvers are generated and/or received, which include the lane change from the current lane to the at least one further lane and a starting time of the change, wherein the starting times of the at least two preliminary driving maneuvers correspond to different points in time. The at least two driving maneuvers are compared taking into account the respective starting times. One of the starting times is selected based on the comparison.

The invention is based on the basic idea of determining the optimal starting time for the lane change from the current lane to the at least one further lane by comparing various preliminary driving maneuvers with predefined, different starting times.

The starting time is therefore treated as a parameter that is defined for the individual preliminary driving maneuvers. By comparing these preliminary driving maneuvers having different starting times with one another, the optimal starting time can be determined or, more clearly, selected from the several different starting times.

Here and in the following, an "optimal starting time" is always to be understood as the starting time of the several different starting times that best meets a predefined comparison criterion.

Here and in the following, a "preliminary driving maneuver" is to be understood as meaning that a corresponding space-time trajectory of the motor vehicle is not yet finally defined on a line, but rather is only defined in certain spatio-temporal areas.

One aspect of the invention provides that the following steps are carried out to compare the at least two driving maneuvers:
  generating one target driving maneuver based on respectively one of the at least two preliminary driving maneuvers;
  comparing the at least two target maneuvers; and
  selecting one of the at least two target driving maneuvers based on the comparison, wherein the associated starting time of the preliminary driving maneuver on which the selected target driving maneuver is based is selected as the starting time.

In order to determine the optimal starting point, not only are the respective preliminary driving maneuvers compared with one another, but rather the respective associated target driving maneuver is first determined and these target driving maneuvers are then compared with one another.

The target driving maneuvers are in each case the driving maneuver that the motor vehicle is to perform when the lane change starts at the corresponding point in time. Accordingly, the target maneuvers each include a space-time trajectory that describes the planned path of the motor vehicle.

In this way, the actual, final options of trajectory planning for the motor vehicle are compared and the optimal starting time is determined based on this comparison.

According to a further aspect of the invention, the at least two preliminary driving maneuvers are optimized in order to generate the target driving maneuvers. In other words, the target driving maneuvers are the respectively optimized preliminary driving maneuvers.

The optimal target driving maneuver is thus determined for several possible starting times, in particular for all possible starting times. Each of the determined target maneuvers is "locally optimal," i.e., optimal provided that the respective associated starting time is fixed. By comparing the optimal target maneuvers, the "globally optimal" target maneuver can then be determined. The starting time associated with this globally optimal target maneuver is then selected.

According to one embodiment of the invention, a cost function is determined which assigns a cost factor to the preliminary driving maneuvers at least on the basis of the respective starting time, the cost factors being compared to compare the at least two driving maneuvers, in particular wherein the cost function is extremized in order to optimize the at least two preliminary driving maneuvers. Each of the target driving maneuvers described above is the driving maneuver which extremizes the cost function for the respective starting time. In other words, the cost function concerning the respective target driving maneuver has at least one local extreme, in particular one global extreme. Accordingly, the target driving maneuver is a driving maneuver that is optimized compared to the respective preliminary driving maneuver.

In the following, an "optimized driving maneuver" is always to be understood to be such a driving maneuver, whose assigned space-time trajectory extremizes the cost function at least locally and in particular globally.

A further aspect of the invention provides that a cost function is determined for a longitudinal movement of the motor vehicle and for a lateral movement of the motor vehicle. The two cost functions can be extremized one after the other, in parallel or independently of one another.

In particular, the cost function for the longitudinal movement of the motor vehicle is first extremized, as a result of which an optimized longitudinal trajectory for the motor vehicle is obtained. Based on the optimized longitudinal trajectory, the cost function for the lateral movement can then be extremized, whereby the respective target maneuver is obtained in each case.

In particular, the cost function is minimized in order to obtain the respective target maneuver. The optimal driving maneuver, that is to say the target driving maneuver, can be determined in a simple manner due to the fact that the more favorable the corresponding driving maneuver is, the smaller the cost factor becomes.

It should be pointed out that with another possible definition of the cost function, for example a cost function multiplied by (−1), the cost function must be maximized in order to obtain the target driving maneuver. However, the definition of the cost function chosen above, namely that the more favorable the corresponding driving maneuver, the smaller the cost factor, corresponds to the intuitive understanding of a cost factor.

Another aspect of the invention provides that the cost factors associated with the at least two target driving maneuvers are compared with one another in order to compare the at least two target driving maneuvers. The cost function or the cost factors serve as a comparison criterion in order to assess which of the target maneuvers should be selected, which are each determined on the basis of the respective starting time of the lane change. In particular, that target driving maneuver and thus that starting time is selected whose associated cost factor is the lowest.

According to one embodiment of the invention, the cost function depends on a square of a respective trajectory, in particular at least the speed of the motor vehicle in the longitudinal direction of the road, which is assigned to the corresponding preliminary driving maneuver. The cost function is therefore a square function, which is why there is always at least one local extreme of the cost function. In other words, there is always a solution to the optimization problem.

In particular, the cost function depends on the first time derivative of the (longitudinal) trajectory of the motor vehicle, that is to say on the (longitudinal) speed of the motor vehicle. Furthermore, the cost function can depend on the second time derivative of the (longitudinal) trajectory of the motor vehicle, that is to say on the (longitudinal) acceleration of the motor vehicle. In addition, the cost function can depend on the third time derivative of the (longitudinal) trajectory of the motor vehicle, that is to say on the change in the (longitudinal) acceleration of the motor vehicle, which is also referred to as a jolt.

The at least two preliminary driving maneuvers are preferably optimized under at least one secondary condition. The at least one secondary condition can include a safety condition, a comfort condition and/or a feasibility condition. An example of a feasibility condition is whether the motor vehicle can even reach a specific space-time range due to a maximum acceleration or a maximum deceleration of the motor vehicle. An example of a comfort condition is whether the acceleration in the longitudinal and/or transverse direction exceeds a predefined threshold value which, as experience has shown, is perceived as unpleasant by vehicle occupants. An example of a safety condition is a minimum distance to be observed from other road users or a speed limit.

In particular, the at least one safety condition comprises a predetermined spatial safety distance and/or a predetermined temporal safety distance. In this context, a "temporal safety interval" is to be understood as a period of time in which the vehicle can definitely still move collision-free starting from the instantaneous point in time, even if the motor vehicle does not change its state of movement, for example does not brake. This period can also be referred to as the "time to collision."

A spatial safety distance always corresponds to a temporal safety distance, wherein the temporal safety distance depends on the current speed of the motor vehicle. More precisely, the temporal safety distance results from the quotient of the spatial safety distance and the current speed of the motor vehicle.

Another aspect of the invention provides that the at least one secondary condition is time-varying and/or dependent on the corresponding starting time. When the cost function is extremized, i.e., when the driving maneuver is optimized, time-variant secondary conditions are taken into account. As a result, the road traffic situation, in which the motor vehicle currently is, is taken into account when optimizing the respective driving maneuver. In particular, this takes into account the fact that the road traffic situation, in which the motor vehicle currently is, changes with the starting time of the lane change. As a result, a suitable driving maneuver for the motor vehicle for the various starting times can be generated in real time in every road traffic situation.

In other words, the time-variant secondary conditions are not temporally static secondary conditions, but rather secondary conditions that change over time, in particular with the respective starting time, and describe the current and/or future road traffic situation in which the motor vehicle is.

According to an embodiment of the invention, at least the current lane and/or the at least one further lane are or is transformed into a Frenet-Serret coordinate system. In this coordinate system, every road is free of curvature, so that regardless of an actual course of the road, every road traffic situation can be treated in the same way.

According to a further embodiment of the invention, the motor vehicle is controlled based on the selected starting time, in particular fully automatically controlled. In other words, the motor vehicle is controlled, in particular controlled fully automatically, according to the selected target driving maneuver.

The object is furthermore achieved according to the invention by a control device for a system for controlling a motor vehicle or for a motor vehicle, the control device being designed to carry out a method according to one of the preceding claims. With regard to the advantages and properties of the control device, reference is made to the above explanations relating to the method for the automated control of a motor vehicle, which also apply to the control device and vice versa.

The object is further achieved according to the invention by a motor vehicle with a control device described above, in particular wherein the motor vehicle has at least one vehicle-internal sensor, in particular an acceleration sensor, a steering angle sensor, a radar, a LIDAR, and/or a camera. With regard to the advantages and properties of the motor vehicle, reference is made to the above explanations relating to the method for the automated control of a motor vehicle, which also apply to the motor vehicle and vice versa.

The object is furthermore achieved according to the invention by a computer program having program code means in order to carry out the steps of a method described above if the computer program is executed on a computer or a corresponding computing unit, in particular a computing unit of a control device described above. With regard to the advantages and properties of the computer program, reference is made to the above explanations regarding the method for the automated control of a motor vehicle, which also apply to the computer program and vice versa.

The term "program code means" refers here and below to computer-executable instructions in the form of program code and/or program code modules in compiled and/or in uncompiled form, which can be in any programming language and/or in machine language.

BRIEF DESCRIPTION OF THE DRAWINGS

Further advantages and characteristics of the invention will become apparent from the following description and the accompanying drawings, to which reference is made. In the drawings.

DESCRIPTION

Figure 1:
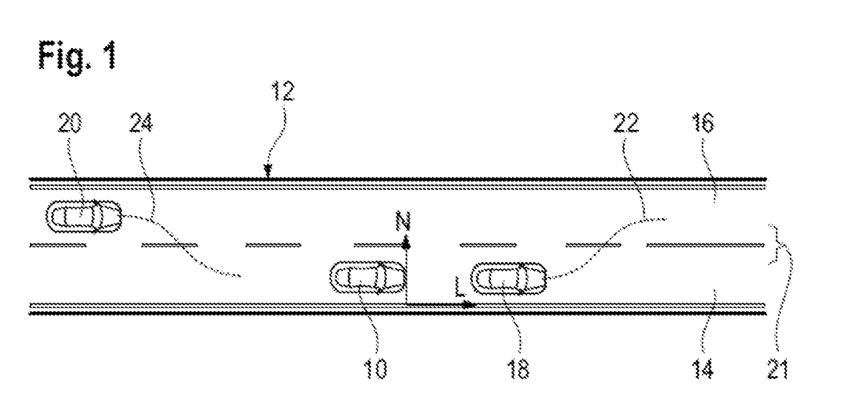
FIG. 1 schematically shows a road traffic situation.

FIG. 1 schematically shows a road traffic situation in which a motor vehicle 10 is traveling on a road 12 in a current lane 14. Another lane 16 runs adjacent to the current lane 14.

In addition, a first further road user 18 and a second further road user 20 drive on the road 12 in the current lane 14 or in the further lane 16. In the example shown, the other road users 18, 20 are passenger cars, but could also be trucks, motorcycles, or any other road users.

Between the current lane 14 and the further lane 16 there is a lane change zone 21, which partially overlaps with the current lane 14 and the further lane 16.

The dashed lines 22 and 24 indicate that the first further road user 18 plans in the near future to change from the current lane 14 via the lane change zone 21 to the further lane 16 or that the second further road user 20 plans in the near future to change from the further lane 16 via the lane change zone into the current lane 14 of the motor vehicle 10. This is indicated by the other road users 18, 20, for example, by using the corresponding direction indicator.

In addition, a coordinate system with a longitudinal axis and a normal axis is shown in FIG. 1, the longitudinal axis defining a longitudinal direction L and the normal axis defining a transverse direction N. The origin of the coordinate system lies in the longitudinal direction L at the current position of the tip of the motor vehicle 10 and, viewed in the longitudinal direction L, on the right side of the road.

This special coordinate system, which is also used in the following, is a road-fixed coordinate system, which consequently does not therefore move with the motor vehicle 10. Of course, any other coordinate system can also be used.

Figure 2:
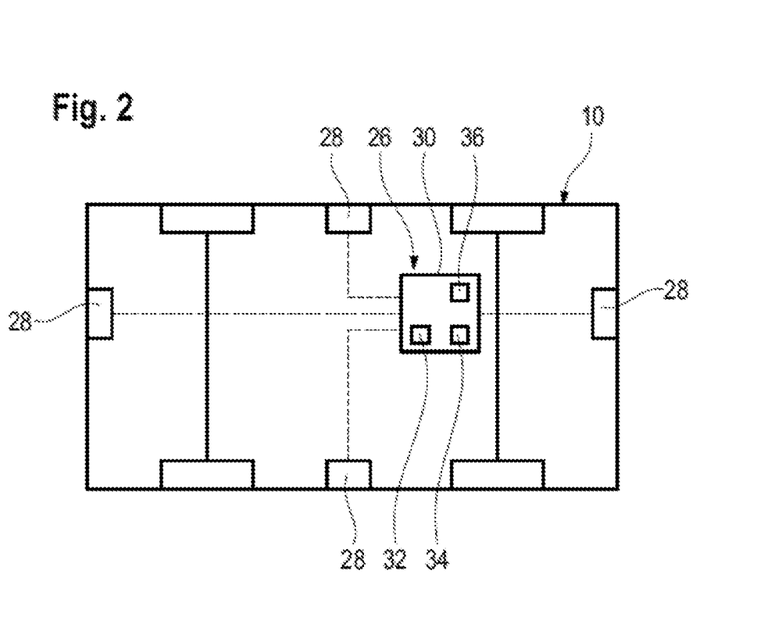
FIG. 2 shows a schematic block diagram of a system for the control of a motor vehicle according to the invention.

As shown in FIG. 2, the motor vehicle 10 has a system 26 for controlling the motor vehicle 10. The system 26 comprises a plurality of sensors 28 and at least one control device 30.

The sensors 28 are arranged at the front, rear, and/or on the side of the motor vehicle 10 and are designed to detect the surroundings of the motor vehicle 10, to generate corresponding environment data and to forward them to the control device 30. More specifically, the sensors 28 detect information at least about the current lane 14, the further lane 16, and the other road users 18, 20.

The sensors 28 are each a camera, a radar sensor, a distance sensor, a LIDAR sensor, and/or any other type of sensor that is suitable for detecting the surroundings of the motor vehicle 10.

As an alternative or in addition, at least one of the sensors 28 can be designed as an interface to a control system, which is assigned to at least the segment of the road 12 shown and is designed to transmit environment data about the road 12 and/or about the other road users to the motor vehicle 10 and/or to the other road users 18, 20. In this case, the one sensor 28 can be designed as a mobile radio communication module, for example for communication in accordance with the 5G standard.

In general terms, the control device 30 processes the environment data received from the sensors 28 and controls the motor vehicle 10 in a partially automated manner and in particular in a fully automated manner, based on the processed environment data. A driver assistance system is thus implemented on the control device 30, which can control a transverse movement and/or a longitudinal movement of the motor vehicle 10 at least partially in an automated manner, in particular fully automatically.

For this purpose, the control device 30 is designed to carry out the method steps explained below with reference to FIGS. 3 to 10. More precisely, the control device 30 comprises a data carrier 32 and a computing unit 34, a computer program being stored on the data carrier 32, which is executed on the computing unit 34 and comprises the program code means in order to carry out the steps of the method explained below.

Figure 3:
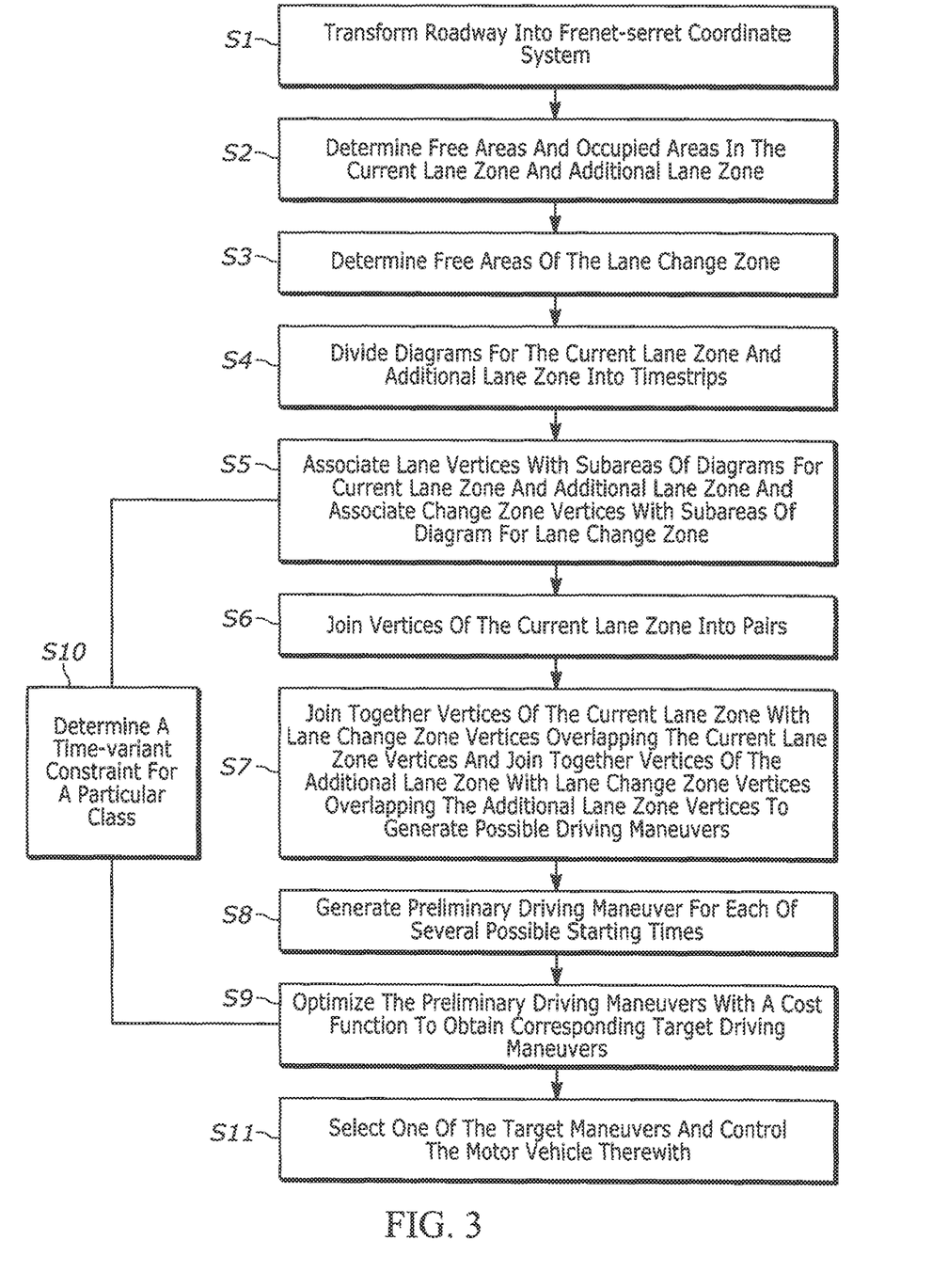
FIG. 3 shows a flow chart of the steps of a method according to the invention.

First, the road 12, more precisely an image of the current lane 14 and the further lane 16 based on the environment data obtained from the sensors 28, is transformed into a Frenet-Serret coordinate system (step S1).

Figure 4A:
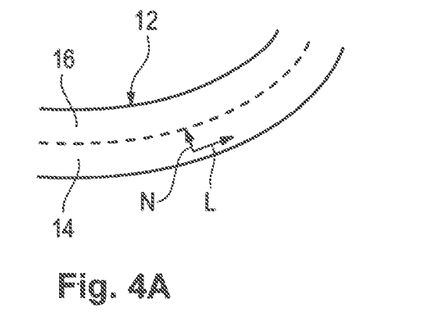
FIG. 4A schematically shows a road before a transformation into a Frenet-Serret coordinate system.
Figure 4B:
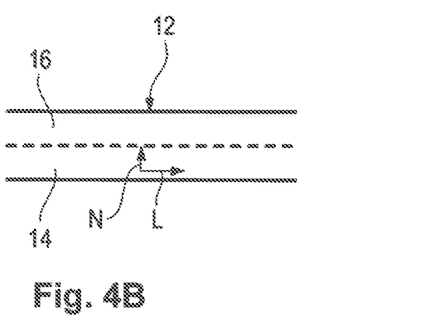
FIG. 4B schematically shows the road after a transformation into a Frenet-Serret coordinate system.

Step S1 is illustrated in FIG. 4. FIG. 4(a) shows the actual course of the road 12. In the example shown, the road has a curvature to the left, as seen in the longitudinal direction L. A local coordinate transformation transforms the road 12 into the Frenet-Serret coordinate system, in which the street 12 no longer has any curvature, the result of this transformation being shown in FIG. 4(b). As can be clearly seen, in this coordinate system the road 12 runs straight and without curvature along the longitudinal direction L.

Next, free areas $B_f$ and occupied areas $B_b$ are determined in the current lane 14 and in the further lane 16 (step S2), the free areas $B_f$ and the occupied areas $B_b$ each being spatiotemporal areas.

The free areas $B_f$ are those spatio-temporal areas that are free from the other road users 18, 20 and other obstacles that prevent driving in the respective lane 14, 16.

The occupied areas $B_b$, on the other hand, are those spatio-temporal areas that are occupied by the other road users 18, 20 and/or by other obstacles, so that the occupied areas $B_b$ cannot be used by the motor vehicle 10.

In order to determine the occupied areas, the control device 30 requires predicted trajectories 22, 24 of the other road users 18, 20. The control device 30 can determine the trajectories 22, 24 itself, for example based on the environment data obtained from the sensors 28, such as the information that a direction indicator of another road user 18, 20 is activated, or based on data exchanged via inter-vehicle communication. Alternatively, the control device 30 can receive the trajectories 22, 24 directly from the other road users 18, 20 or from the control system.

Figure 5:
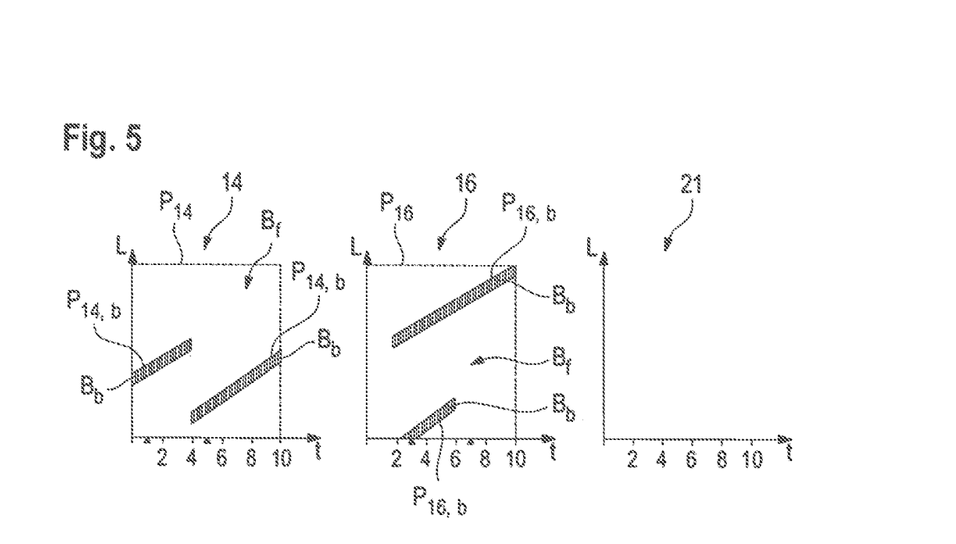
FIGS. 5 to 10 each illustrate individual steps of the method according to the invention from FIG. 3.

As shown in FIG. 5 using the specific example of FIG. 1, the free areas $B_f$ and the occupied areas $B_b$ are first determined for the current lane 14 and for the further lane 16, respectively in a t-L-graph, where t is time.

In this example, the first further road user 18 starts a lane change maneuver from the current lane 14 to the further lane 16 at the time t=1s, which maneuver is completed at the time t=5s. In the graphs shown in FIG. 5, the first further road user 18 occupies the upper area of the two occupied areas $B_b$. During the process of the lane change, the first further road user 18 occupies both lanes 14, 16 at least temporarily.

The second further road user 20 starts a lane change maneuver from the further lane 16 to the current lane 14 at the time t=3s, which maneuver is completed at the time t=7s. In the graphs shown in FIG. 5, the second further road user 20 occupies the lower of the two occupied areas $B_b$.

The gradient of the occupied areas $B_b$ corresponds to the speed of the corresponding other road user 18 or 20. In the example shown in FIGS. 5 to 10, the speed of the other road users 18, 20 is therefore constant.

For simplification, the coordinate in the transverse direction N is discretized, so it can only assume the three different values that correspond to the current lane 14, the further lane 16, or the lane change zone 21. The three graphs shown in FIG. 5 are each a t-L-graph for the current lane 14, for the further lane 16, and for the lane change zone 21.

The hatched segments in the graphs each correspond to the occupied areas $B_b$ of the respective lane 14, 16. By contrast, the unshaded segments in the graphs correspond to the free areas $B_f$ of the respective lane 14, 16.

To determine the free areas $B_f$, a space-time polygon $P_{14}$ or $P_{16}$ is first determined for each lane 14, 16, which corresponds to the entire lane 14 or 16 in front of the motor vehicle 10, in particular the part of the lanes 14, 16, which is within reach of the sensors 28. In FIG. 5, the polygons $P_4$ and $P_{16}$ are the rectangles indicated by the broken lines.

Furthermore, space-time polygons $P_{14,b}$ or $P_{16,b}$ which surround the occupied areas $B_b$ of the respective lane 14, 16 are determined respectively for the two lanes 14, 16.

The free areas $B_f$ in the current lane 14, or rather a polygon $P_{14,f}$, which corresponds to the free areas $B_f$, is then determined by polygon clipping by removing the polygons $P_{14,b}$ from the polygon $P_{14}$. In other words, concerned here is the operation $$P_{14,f} = P_{14} \backslash P_{14,b}.$$

Analogously, the free areas $B_f$ in the further lane 16 are determined by polygon clipping by removing the polygons $P_{16,b}$ from the polygon $P_{16}$. The operation $P_{16,f} = P_{16} \backslash P_{16,b}$ is thus carried out.

Figure 6:
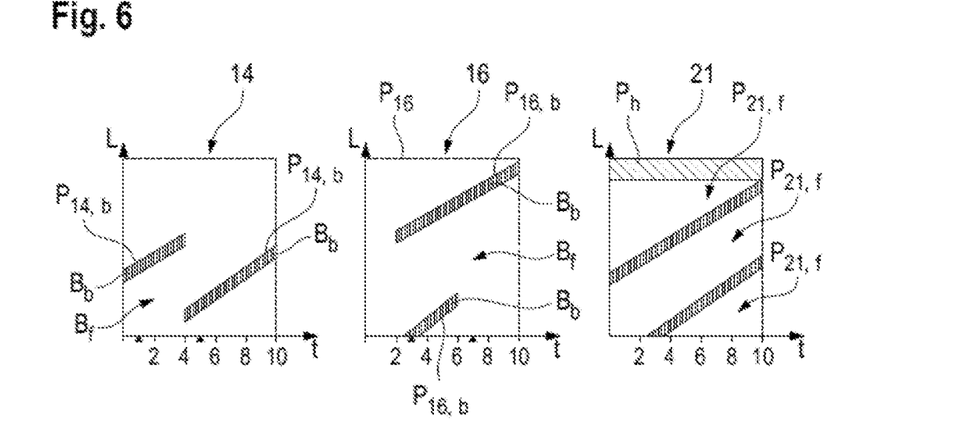

Next, as illustrated in FIG. 6, the free sub-areas of the lane change zone 21 are determined (step S3). Here, the lane change zone 21 is free if both the current lane 14 and the further lane 16 are free and if the lane change zone 21 is not passable for other reasons, for example due to obstacles or a no overtaking rule.

Therefore, the free sub-areas of the lane change zone 21, or rather a polygon $P_{21,f}$, which corresponds to the free sub-areas of the lane change zone 21, are determined as the intersection of the two polygons $P_{14,f}$ and $P_{16,f}$. If the lane change zone 21 is not passable due to an obstacle or otherwise, a corresponding space-time polygon $P_h$, which encloses the non-passable sub-area of the lane change zone 21, is determined and removed from the intersection mentioned above.

In other words, the free sub-areas $P_{21,f}$ of the lane change zone 21 thus result from the operation $$P_{21,f} = (P_{14,f} \cap P_{16,f}) \backslash P_h.$$

Figure 7:
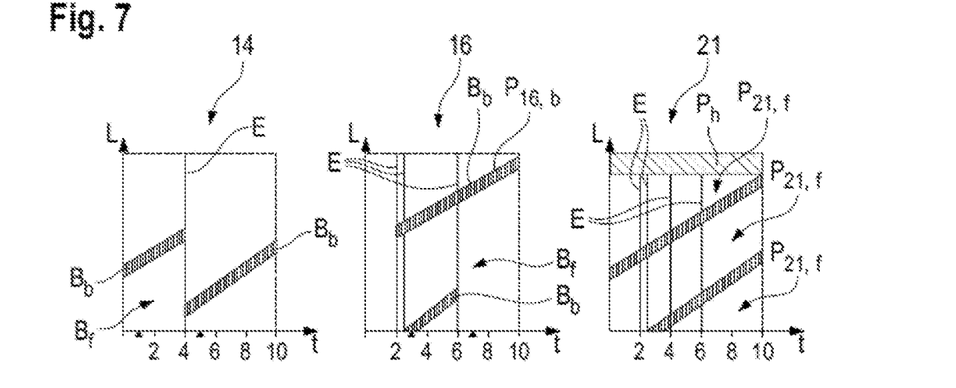

Now the graphs for the current lane 14 and for the further lane 16 are each divided into time strips (step S4), wherein a new time strip begins with each event. In FIG. 7, the various time strips are separated from one another by vertical dividing lines E, which are inserted into the graph for an event. An event is to be understood here and, in the following, to mean any type of change in the use of the respective lane 14, 16.

If an occupancy of any sub-area of the current lane 14 or the further lane 16 begins or ends at a specific point in time, a new time strip begins in the graph for the current lane 14 or for the further lane 16 at this point in time.

The dividing lines E between the individual time strips in the graphs for both lanes 14, 16 are also transferred to the graph for the lane change zone 21.

Figure 9:
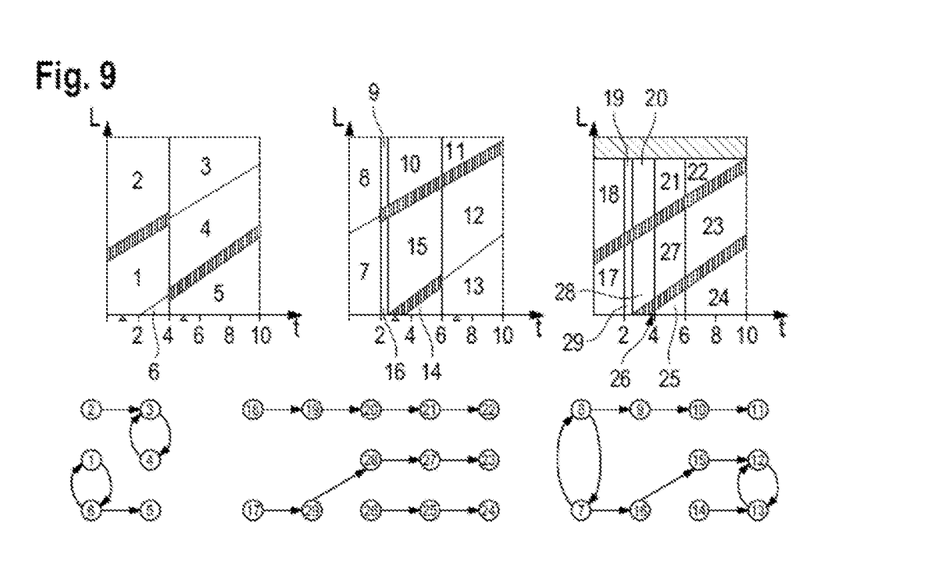
Figure 10:
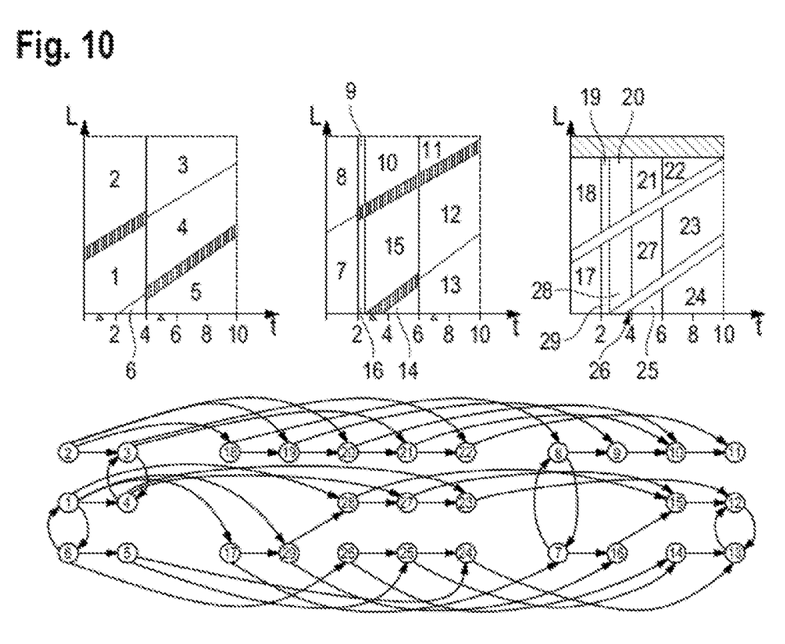

In order to achieve a consistent division of the graphs between the three graphs for the current lane 14, for the further lane 16, and the lane change zone 21, oblique dividing lines T are inserted into the graphs for the current lane 14 and the further lane 16, which each represent an extension of one of the occupied areas $B_b$. These additional oblique dividing lines T are shown in FIGS. 8 to 10.

The vertical dividing lines E, the oblique dividing lines T, and the occupied areas $B_b$ divide each of the three graphs into a plurality of sub-areas $T_i$, wherein i is a natural number greater than zero, which can take on values from 1 to a total number of sub-areas $T_i$.

At least one of the oblique dividing lines and/or at least one of the vertical dividing lines can also be omitted or removed again in order to simplify the following steps of the method. In particular, all oblique dividing lines can be omitted.

Figure 8:
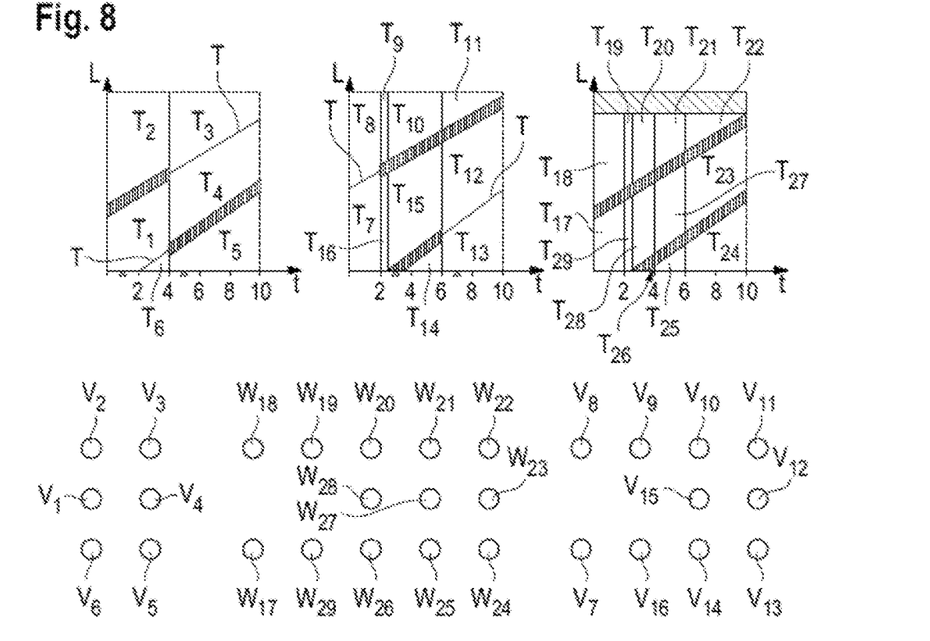

As shown in FIG. 8, a lane vertex $V_i$ is assigned to each of the sub-areas $T_i$ of the graphs for the current lane 14 and for the further lane 16 in the next step, whereas a change zone vertex $W_i$ is assigned to each sub-area $T_i$ of the graph for the lane change zone 21 (step S5). Here again, i is a natural number greater than zero, which can assume values from 1 up to a total number of sub-areas $T_i$.

In FIG. 8, the lane vertices $V_i$ and the lane change zone vertices $W_i$ are each arranged by time in the graph, i.e., those vertices which correspond to sub-areas $T_i$ with shorter times are further to the left than those vertices which are assigned to sub-areas $T_i$ with longer times.

Next, the lane vertices $V_i$ of the current lane 14 are connected in pairs by edges (step S6), more precisely by directional edges, if a driving maneuver of the motor vehicle 10 is possible between the sub-areas $T_i$ to which the lane vertices $V_i$ are assigned.

A driving maneuver is defined as "possible" if and only if the two sub-areas $T_i$ directly adjoin one another, that is, if they are not separated from one another by an occupied area $B_b$. In addition, a driving maneuver is of course only possible in the positive direction of time.

The same procedure is repeated for the lane vertices $V_i$ of the further lane 16 and for the lane change zone vertices $W_i$ of the lane change zone 21.

It should be noted that the letters "T," "V" and "W" have been omitted from FIGS. 9 and 10 for reasons of clarity. Instead, the sub-areas and the vertices were simply given the corresponding number. In FIGS. 9 and 10, numbers are not reference numerals, but represent the index of the corresponding sub-area or the corresponding vertex.

The result of step S6 is shown in FIG. 9. The graph obtained in step S6 already contains all possible driving maneuvers for the motor vehicle 10 within the two lanes 14, 16 and within the lane change zone 21.

Next, those lane vertices $V_i$ of the current lane 14 are connected to those lane change zone vertices $W_i$ via directional edges whose assigned sub-areas $T_i$ of the current lane 14 or lane change zone 21 overlap one another (step S7). In other words, those lane vertices $V_i$ are connected to those lane change zone vertices $W_i$ whose assigned sub-areas $T_i$ have an intersection that is not empty if the two graphs for the current lane 14 and for the lane change zone 21 are superimposed.

In addition, those lane change zone vertices $W_i$ are connected to those lane vertices $V_i$ of the further lane 16 via directional edges whose associated sub-areas $T_i$ of the lane change zone 21 or the further lane 16 overlap one another. Thus, those lane vertices $V_i$ are connected to those lane change zone vertices $W_i$ whose assigned sub-areas $T_i$ have an intersection that is not empty if the two graphs for the further lane 16 and for the lane change zone 21 are superimposed.

In other words, in step S7, the individual sub-areas $T_i$ of the free areas $B_f$ are divided into lane change areas in which a lane change between the two lanes 14, 16 is possible, and lane keeping areas in which a lane change between the two lanes 14, 16 is not possible.

The result of step S7 is shown in FIG. 10. The graph obtained in step S7 contains all possible driving maneuvers for the motor vehicle 10, which include the lane change from the current lane 14 into the further lane 16. Each of the possible driving maneuvers corresponds to an uninterrupted line of edges in the driving maneuver graph shown in FIG. 10.

The steps S1 to S7 described above represent an option of determining many different possible driving maneuvers for the motor vehicle 10, in particular all possible driving maneuvers.

It should be pointed out, however, that any other suitable method can also be used to determine the possible driving maneuvers.

The various possible driving maneuvers determined in this way are then processed further by an optimization module 36 of the control device 30 or by an optimization module of the computer program.

In general terms, the optimization module is designed to provide an optimal starting time $T_{LC,opt}$ to determine the lane change of the motor vehicle 10.

First of all, a preliminary driving maneuver is generated for each of several possible starting times (step S8).

For the generation of the several preliminary driving maneuvers it is sufficient if a single space-time trajectory is generated for each of the possible starting times, for example by adding a single point from the individual space-time areas to which a lane vertex $V_i$ or a lane change zone vertex $W_i$ is assigned, selected, and then connected to each other. The resulting trajectory should, however, be smooth, i.e., not have any kinks or the like. For example, the individual points are connected to one another via spline functions in order to obtain the space-time trajectories.

In the event that there are several different options for the preliminary driving maneuver at a specific starting point in time, it can be provided that the preliminary driving maneuver is selected whose associated trajectory is the shortest.

The generated preliminary driving maneuvers are therefore each linked to a specific starting time for the lane change of the motor vehicle. In the case of the preliminary driving maneuvers, a corresponding space-time trajectory of the motor vehicle is not yet finally fixed on a certain line, but rather is only limited to certain spatio-temporal areas.

The preliminary driving maneuvers are now each optimized so that a target driving maneuver is obtained from each of the preliminary driving maneuvers (step S9).

To optimize the preliminary driving maneuvers a cost function F is determined that assigns a cost factor $K=F(x)$ to the space-time trajectory $$x_{T_{LC},i} = \begin{pmatrix} L(t) \\ N(t) \end{pmatrix}$$

that describes the respective driving maneuver with a starting time $T_{LC,i}$ for the change of the motor vehicle 10.

For example, the cost function can take the following form:

$$\gamma_1(\dot{L}_E(T_{LC,pre}))^2 - 2\gamma_1 \dot{L}_E(T_{LC,pre})\dot{L}_{des} + \gamma_2(\ddot{L}_E(0s))^2$$

$L_E$ is the (longitudinal) trajectory of the motor vehicle 10, $L_{des}$ is a desired end speed of the motor vehicle 10 and $T_{LC,pre}$ is the corresponding preliminary starting time for the lane change. The coefficients $\gamma_t$ represent weighting factors for the individual terms of the cost function.

In this example, the cost function depends explicitly on the speed of the motor vehicle 10, on the acceleration of the motor vehicle 10 and on the desired final speed of the motor vehicle 10. The dependency on the starting time, however, is only implicit.

The cost function may have the following further form:

$$\gamma_1\left(\dot{L}_E(T_{LC,pre})\right)^2 - 2\gamma_1 \dot{L}_E(T_{LC,pre})\dot{L}_{des} +$$
$$\gamma_2\left(L_E^{(3)}(T_{LC,pre})^2 + L_E^{(3)}\left(\frac{T_{LC,pre}}{3}\right)^2 + L_E^{(3)}\left(\frac{2T_{LC,pre}}{3}\right)^2\right) + + \gamma_3 T_{LC,pre}$$

Here, the cost function also depends on the third time derivative of the (longitudinal) trajectory of the motor vehicle, i.e., on the jolt $L_E^{(3)}$.

In addition, the cost function explicitly (i.e., directly) depends on the starting time of the lane change by the term $\gamma_3 T_{LC,pre}$. It can thereby be taken into account that the motor vehicle 10 may want to change lanes as soon as possible, for example in order to avoid having to undertake braking maneuvers itself.

In order to optimize the respective preliminary driving maneuver, the cost function is extremized, more precisely minimized. The driving maneuver whose space-time trajectory leads to a local minimum of the cost function is therefore determined for each of the several starting times. The optimized driving maneuver, that is to say the respective target driving maneuver, is therefore assigned a locally minimal cost factor, in particular a globally minimal cost factor.

The motor vehicle 10 is subject to various intrinsic restrictions. For example, the motor vehicle 10 has a maximum acceleration and a maximum deceleration which it cannot exceed in each case. In addition, the motor vehicle 10 is subject to various external restrictions. For example, it may not be in the same place as an obstacle, which would amount to a crash. There is also a speed limit on most roads.

In order to take the intrinsic and external constraints into account, secondary conditions are determined based on the constraints, under which the cost function is then minimized. In this way, a target driving maneuver is obtained, the target driving maneuver representing the optimal driving maneuver from the respective driving maneuver class under the given secondary conditions.

At least one of the secondary conditions can be a time-variant secondary condition that is determined individually for the respective driving maneuver class (step S10).

The at least one time-variant secondary condition is determined based on the space-time polygons determined in steps S1 to S5, which describe the free space-time regions $B_f$ and the occupied space-time regions $B_b$ and the subregions $T_i$.

The motor vehicle 10 must not be in one of the occupied areas $B_b$ at any time. However, this alone is generally too weak as a secondary condition, because a certain safety distance is normally necessary.

Therefore, the at least one time-variant secondary condition is determined in such a way that it comprises a predetermined temporal and/or a predetermined spatial safety distance from the occupied areas $B_b$.

Under a "time safety distance" a time period $T_{TTC}$ is to be understood, in which the vehicle can definitely still move collision-free starting from the current point in time, even if the motor vehicle does not change its state of movement, that is, for example, if it does not brake. This period can also be referred to as the "time to collision."

A spatial safety distance always corresponds to a temporal safety distance, wherein the temporal safety distance depends on the current speed of the motor vehicle. More precisely, the temporal safety distance results from the quotient of the spatial safety distance and the current speed $v(t)$ of the motor vehicle.

The at least one time-variant secondary condition can generally be formulated as follows:

$$L(t)+v(t)\cdot T_{TTC} \notin B_b.$$

At any given time t, the longitudinal coordinate L of the space-time trajectory x(t) must therefore have a minimum distance from the occupied areas $B_b$, wherein the minimum distance is dependent on the current speed v(t).

The time-variant secondary condition is also dependent on where the motor vehicle 10 is currently located. For example, if it is present in the sub-area $T_5$ (see FIG. 8), then the corresponding secondary condition is $$L(t)+v(t)\cdot T_{TTC} \leq \max P_{14,b}(t+T_{TTC}).$$

It should be noted that the above inequality is to be understood conceptually rather than literally. Under "max P" it should be understood that the corresponding polygon limits the sub-area $T_5$ on top.

Figuratively speaking, the motor vehicle 10 must not be present in the area limited by the polygon $P_{14,b}$ either when the motor vehicle uniformly continues its movement for the time $T_{TTC}$.

However, if the motor vehicle is in the sub-area $T_{15}$, the time-variant secondary condition is as follows:

$$\min P_{16,b}(t+T\_TTC) \leq L(t)+v(t)\cdot T_{TTC} \leq \max P_{14,b}(t+T_{TTC})$$

Analogous to the case described above the polygon that limits the sub-area $T_{15}$ on the underside is described by $\min P_{16,b}(t+T_{TTC})$ here.

The time-variant secondary condition under which the driving maneuver is optimized is therefore individually determined for the individual sub-areas $T_i$. Accordingly, the time-variant secondary condition can also change over the course of the space-time trajectory.

In particular, the at least one time-variant secondary condition is determined based on the respective starting time $T_{LC,i}$. Accordingly, the time-variant secondary conditions can be dependent on the starting time $T_{LC}$.

Further secondary conditions can also be provided, for example a safety condition, a comfort condition and/or a feasibility condition. An example of a feasibility condition is whether the motor vehicle can even reach a specific space-time range due to a maximum acceleration or a maximum deceleration of the motor vehicle. An example of a comfort condition is whether the acceleration in the longitudinal and/or transverse direction exceeds a predefined threshold value which, as experience has shown, is perceived as unpleasant by vehicle occupants. An example of a safety condition is a minimum distance to be observed from other road users or a speed limit.

The target maneuver can then be determined, for example, by applying a triple integrator, which is defined as follows:

$$L_E(k+1) = L_E(k) + \dot{L}_E(k)h + \ddot{L}_E(k)\frac{h^2}{2} + L_E^{(3)}(k)\frac{h^3}{6},$$

$$\dot{L}_E(k+1) = \dot{L}_E(k) + \ddot{L}_E(k)h + L_E^{(3)}(k)\frac{h^2}{2},$$

$$\ddot{L}_E(k+1) = \ddot{L}_E(k) + L_E^{(3)}(k)h,$$

$$L_E(0) = L_{E,0}, \quad \dot{L}_E(0) = \dot{L}_{E,0}, \quad \ddot{L}_E(0) = \ddot{L}_{E,0},$$

wherein h is a positive real number greater than zero.

In summary, in step S9, driving maneuvers that are conceptually different from one another, that is to say the preliminary driving maneuvers, are optimized in each case under certain secondary conditions. Correspondingly, for each preliminary driving maneuver, the respective associated optimal driving maneuver, that is to say the corresponding target driving maneuver, is obtained.

The result of step S9 is therefore a set of optimal driving maneuvers that belong to different starting times of the lane change.

It should be pointed out that the optimization can take place in two stages, wherein the longitudinal trajectory and then the transverse trajectory of the motor vehicle 10 is optimized first.

The multiple target driving maneuvers, or rather the respective cost factors assigned to the target driving maneuvers, are now compared with one another and, based on the comparison, one of the target driving maneuvers and thus also one of the starting times is selected (step S11).

More precisely, that target driving maneuver is selected whose associated cost factor is the lowest.

The motor vehicle 10 can then be controlled in an at least partially automated manner and in particular in a fully automated manner by the control device 30 according to the selected driving maneuver.

According to the method described above, the optimal starting time $T_{LC,opt}$ of the lane change from the current lane 14 to the at least one further lane 16 is determined by comparing various preliminary driving maneuvers, each with predefined starting times $T_{LC,i}$ which are different from each other. For this purpose, an optimized target maneuver is determined based on the preliminary driving maneuvers.

The starting time $T_{LC,i}$ is treated as a parameter that is defined for the individual preliminary driving maneuvers and for the target driving maneuvers. By comparing the cost factors assigned to the target driving maneuvers with one another, the optimum starting time $T_{LC,opt}$ can be determined or rather be chosen from the several different starting times $T_{LC,i}$.

REFERENCE SIGN 10 motor vehicle
12 road
14 current lane
16 further lane
18 first other road user
20 second other road user
21 lane change zone
22 dashed line
24 dashed line
26 system for controlling the motor vehicle
28 sensors
30 control unit
32 data carrier
34 computing unit
36 optimization module

The invention claimed is:

1. A method for controlling in an automated manner a motor vehicle (10) traveling on a road (12) in a current lane (14), the road (12) having at least one further lane (16) comprising the following steps:

generating and/or receiving at least two preliminary driving maneuvers which comprise a lane change from the current lane (14) to the at least one further lane (16) and a respective starting time associated with each lane change, wherein the respective starting times are at different times;

determining a cost function which assigns a cost factor to each of the at least two preliminary driving maneuvers at least on the basis of the respective starting times, wherein the cost function is explicitly dependent on the starting time of the lane change;

extremizing the cost function in order to optimize the at least two preliminary driving maneuvers into respective target driving maneuvers;

comparing the at least two target driving maneuvers taking into account the respective starting times;

selecting one of the starting times based on the comparison; and automatically controlling the vehicle (10) to follow the target driving maneuver of the at least two target driving maneuvers that begins at the selected respective starting time.

2. The method according to claim 1, wherein the cost factors associated with the at least two target driving maneuvers are compared with one another in order to compare the at least two target driving maneuvers.

3. The method according to claim 1, wherein the cost function is quadratically dependent on a speed of the motor vehicle in a longitudinal direction (L) of the road (12).

4. The method according to claim 1, wherein the at least two preliminary driving maneuvers are optimized under at least one secondary condition.

5. The method according to claim 4, wherein the at least one secondary condition is time-variant and/or dependent on the starting time.

6. The method according to claim 1, wherein at least one of the current lane (14) and the at least one further lane (16) is transformed into a Frenet-Serret coordinate system.

7. A control device (30) for a system (26) of the motor vehicle (10) designed to carry out the method of claim 1.

8. A computer program for performing the method of claim 1 on a computing unit (34) of a control device (30) of the motor vehicle (10).

* * * * *